United States Patent
Cohen et al.

(10) Patent No.: US 6,559,235 B2
(45) Date of Patent: May 6, 2003

(54) GRAFTING OF POLYOLEFINS

(75) Inventors: Gordon Mark Cohen, Wynnewood, PA (US); Jose Manuel Rodriguez-Parada, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/916,157

(22) Filed: Jul. 26, 2001

(65) Prior Publication Data

US 2002/0072571 A1 Jun. 13, 2002

Related U.S. Application Data

(60) Provisional application No. 60/221,794, filed on Jul. 28, 2000.

(51) Int. Cl.[7] .............................................. C08F 255/02
(52) U.S. Cl. ........................ 525/276; 525/193; 525/240; 525/243; 525/273; 525/301; 525/326.5
(58) Field of Search ................................. 525/276, 193, 525/243, 273, 240, 326.5, 301

(56) References Cited

U.S. PATENT DOCUMENTS

| | | | | |
|---|---|---|---|---|
| 5,112,919 A | * | 5/1992 | Furrer et al. | 525/72 |
| 5,140,074 A | | 8/1992 | DeNicola, Jr. et al. | |
| 5,411,994 A | | 5/1995 | Galli et al. | |
| 5,696,203 A | * | 12/1997 | Hummel et al. | 525/193 |
| 5,698,617 A | * | 12/1997 | Marzola et al. | 523/202 |
| 6,100,324 A | | 8/2000 | Choi et al. | |
| 6,191,231 B1 | | 2/2001 | Drysdale et al. | |
| 6,337,373 B1 | * | 1/2002 | Formaro et al. | 525/276 |

FOREIGN PATENT DOCUMENTS

| | | |
|---|---|---|
| EP | 0 519 341 A1 | 12/1992 |
| GB | 2002395 | 2/1979 |

* cited by examiner

Primary Examiner—James J. Seidleck
Assistant Examiner—Olga Asinovsky

(57) ABSTRACT

Porous polyolefins are especially efficiently free-radically grafted using (fluorinated alkyl)olefins, vinylsilanes or certain carboxylic acids or their esters as the grafting molecules. The use of a solvent to swell the porous polyolefin is sometimes advantageous.

16 Claims, No Drawings

GRAFTING OF POLYOLEFINS

CROSS-REFERENCE TO RELATED APPLICATION

This application claims priority under 35 U.S.C. §119 from U.S. Provisional Application Ser. No. 60/221,794 (filed Jul. 28, 2000), which is incorporated by reference herein for all purposes as if fully set forth.

FIELD OF THE INVENTION

Porous polyolefin particles are particularly efficiently grafted using free radical grafting techniques when the grafting compounds are non-homopolymerizable fluoroolefins, vinyl silanes or selected carboxylic acids or their derivatives.

TECHNICAL BACKGROUND

Grafting of various monomeric compounds or polymers onto already existing polymers is a well-known technique in the art for modifying the properties of existing polymers. These modifications may change the properties of the grafted polymer so that it may, for example, be used as an adhesive between a polymer and other materials, as a compatibilizing agent between polymers, for modifying a polymer surface for example making it hydrophilic or hydrophobic, and for other purposes. The grafted compound may also provide a crosslinking site for the polymer. Grafting allows the production of polymers having certain groups chemically attached to those polymers without having to copolymerize monomers containing those groups when the polymer was originally formed.

Some of the monomeric compounds that may be grafted onto polymers contain olefinic groups. Most often these olefinic group containing compounds are grafted onto the polymer using a process involving free radicals. Usually these free radicals are generated by using ionizing radiation, or a chemical free radical generator such as a peroxide. The monomeric compounds may be divided into two types, those that themselves may be free radically homopolymerized, and those that don't so homopolymerize (to any appreciable extent) in the presence of free radicals. Such homopolymerizable vinyl compounds when so grafted often form grafted polymeric chains and ungrafted homopolymer, so the resulting product is usually a mixture of grafted original polymer and ungrafted homopolymer derived from the monomeric grafting compound. Vinyl compounds that do not appreciably homopolymerize free radically under such circumstances usually graft onto the original polymer as single molecules, sometimes a few molecules (a short oligomeric branch), at a time, and usually there is little or no homopolymer of the nonhomopolymerizable compound in the product. However non-homopolymerizable vinyl compounds are often more difficult to graft than the homopolymerizable compounds.

With solid polymers there is often difficulty in obtaining reasonably uniform grafting of the monomeric compound onto the polymer, since the monomeric compound and chemical free radical generator, if used, cannot contact all of the polymer to be grafted. This has been solved in the art by dissolving the polymer in a solvent and then carrying out the grafting in solution, or by melting the polymer and mixing it while molten with the grafting compound and free radical source. However these methods are relatively expensive to carry out. It has been reported in U.S. Pat. No. 5,140,074 and U.S. Pat. No. 5,411,994 (both incorporated by reference herein for all purposes as if fully set forth) that porous particles of polyolefins may be reasonably uniformly grafted with homopolymerizable vinyl compounds, without the need to melt or dissolve the polyolefin.

It has also been reported in EP-A-0519341 (also incorporated by reference herein for all purposes as if fully set forth) that porous particles of polyolefins may be reasonably uniformly grafted by certain non-homopolymerizable vinyl compounds, especially unsaturated cyclic anhydrides and their diacid and diester derivatives, without the need to melt or dissolve the polyolefin. However the grafting efficiency of these types of non-homopolymerizable grafting agents has been found to be poor, while the grafting compounds reported herein generally graft much more easily to polyolefins.

U.S. Pat. No. 6,191,231 and U.S. Pat. No. 6,100,324 report the free radical grafting of certain fluorinated olefins to polyolefins. The use of porous polyolefins is not mentioned.

SUMMARY OF THE INVENTION

This invention concerns an improved process for the free radical grafting of vinyl compounds onto a porous polyolefin having a pore volume fraction of at least 0.07, by contacting said porous polyolefin with a grafting agent in the presence of free radicals, wherein the improvement comprises using as a grafting agent a non-homopolymerizable monomer selected from the group consisting of a vinyl silane, a compound of the formula $H_2C=CH(CH_2)_nR_f$, and a compound of the formula $R^1CO_2R^2$, wherein:

$R_f$ is a fluoroalkyl group having more fluorine atoms than carbon atoms;

n is 0 or 1;

$R^1$ is hydrocarbyl or substituted hydrocarbyl having 4 or more carbon atoms, and containing an olefinic double bond, provided that said olefinic double bond is not part of a ring; and $R^2$ is hydrogen, hydrocarbyl or substituted hydrocarbyl.

This invention also concerns a process for the grafting of a polyolefin polymer, comprising the step of contacting a porous polyolefin polymer having a pore volume fraction of at least 0.07, a free radical generator, and a non-homopolymerizable grafting monomer selected from the group consisting of a vinyl silane, a compound of the formula $H_2C=CH(CH_2)_nR_f$, and compound of the formula $R^1CO_2R^2$, wherein:

$R_f$ is a fluoroalkyl group having more fluorine atoms than carbon atoms;

n is 0 or 1;

$R^1$ is hydrocarbyl or substituted hydrocarbyl having 4 or more carbon atoms, and containing an olefinic double bond, provided that said olefinic double bond is not part of a ring; and $R^2$ is hydrogen, hydrocarbyl or substituted hydrocarbyl;

wherein said grafting monomer is contacted with said porous polyolefin either simultaneously with said free radical generator, or after contacting said porous polyolefin with said free radical generator, and provided that if said free radical generator is a chemical free radical generator said contacting of said porous polyolefin and said chemical free radical generator is done at a temperature at which said chemical free radical generator generates free radicals.

These and other features and advantages of the present invention will be more readily understood by those of ordinary skill in the art from a reading of the following detailed description. It is to be appreciated that certain features of the invention which are, for clarity, described below in the context of separate embodiments, may also be provided in combination in a single embodiment. Conversely, various features of the invention which are, for brevity, described in the context of a single embodiment, may also be provided separately or in any subcombination.

DETAILED DESCRIPTION OF THE PREFERRED EMBODIMENTS

It is preferred that the porous polyolefin polymer used in the present process is a polymer or copolymer of one or more hydrocarbon olefins, and more preferably that it is:

(a) a homopolymer of ethylene or a linear or branched $C_3$–$C_8$ 1-olefin;

(b) a random copolymer of ethylene or a linear or branched $C_3$–$C_8$ 1-olefin with a second olefin selected from the group consisting of ethylene and $C_3$–$C_{10}$ 1-olefins, provided that, when the second olefin is ethylene the maximum polymerized ethylene content is about 10%, more preferably about 4%, when the olefin is propylene and the second olefin is a $C_4$–$C_{10}$ 1-olefin the maximum polymerized content of said second olefin is about 20%, more preferably about 16%, and when the olefin is ethylene and the second olefin is a $C_3$–$C_{10}$ 1-olefin the maximum polymerized content of said second olefin is about 10%, more preferably about 5%;

(c) a terpolymer of a linear or branched $C_3$–$C_8$ 1-olefin and two different olefins selected from the group consisting of ethylene and $C_4$–$C_8$ 1-olefins, provided that, when ethylene is one of the two different olefins the maximum polymerized ethylene content is about 5%, more preferably about 4%, and when each of the two different olefins is a $C_4$–$C_{10}$ 1-olefin, the maximum polymerized content of the two different $C_4$–$C_{10}$ 1-olefins is about 20%, more preferably about 16%; or (d) a homopolymer of (a) or a random copolymer of (b), impact modified with about 10 to 60% of:
  (i) an ethylene-propylene rubber having an ethylene content of about 7 to 70%, more preferably about 10 to 40%, and most preferably an ethylene-propylene rubber having an ethylene content of about 7 to 40%,
  (ii) an ethylene/butene-1 copolymer rubber having an ethylene content of about 30 to 70%,
  (iii) a propylene/butene-1 copolymer rubber having a butene-1 content of about 30 to 70%,
  (iv) an ethylene/propylene diene monomer rubber having an ethylene content of about 30 to 70% and diene content of about 1 to 10%,
  (v) an ethylene/propylene/butene terpolymer rubber having a propylene content of about 1 to 10% and butene content of about 30 to 70% or a propylene content of about 30 to 70% and a butene content of about 1 to 10%.

Another preferred type of polymer is an ethylene copolymer with one or more of acrylic acid, methacrylic acid, an ester of acrylic acid, an ester of methacrylic acid, and vinyl acetate. Preferably the ethylene is 50 weight percent or more of this copolymer.

In all of the polyolefins listed above, the percentages are weight percentages. The ethylene and $C_3$–$C_8$ 1-olefins which can be used in the preparation of the above olefin polymer materials include ethylene and linear and branched olefins which have at least 3 carbon atoms, such as propylene, 1-butene, 3-methyl-1-butene, 3,4-dimethyl-1-butene, 1-pentene, 4-methyl-1-pentene, 1-hexene, 3-methyl-1-hexene, 1-heptene, and the like.

When the olefin polymer is an ethylene homopolymer it preferably has a density of 0.91 g/cm$^3$ or greater, and when the olefin polymer is an ethylene copolymer with a $C_3$–$C_{10}$ alpha-olefin it preferably has a density of 0.91 g/cm$^3$ or greater. Suitable ethylene copolymers include ethylene/butene-1, ethylene/hexene-1 and ethylene/4-methyl-1-pentene. The ethylene copolymer can be a high-density polyethylene (HDPE) or a linear low-density polyethylene (LLDPE), and the ethylene homopolymer can be a HDPE or a low-density polyethylene (LDPE). Typically the LLDPE and LDPE have densities of 0.91 g/cm$^3$ or greater and the HDPE have densities of 0.95 g/cm$^3$ or greater.

Homopolymers and random copolymers of ethylene, propylene and 1-butene are preferred. With respect to ethylene, HDPE and LLDPE are preferred.

Suitable particulate forms of the olefin polymer material used in the present method include powder, flake, granulate, spherical, cubic and the like. Spherical particulate forms having a pore volume fraction of at least about 0.07, preferably at least about 0.2, are preferred. The spherical particulate olefin polymers having pore volume fractions of at least about 0.2 are obtainable using catalysts and methods of the type described in U.S. Pat. No. 5,221,651 (see, e.g., Examples 2, 3 and 4), U.S. Pat. No. 5,231,119 and U.S. Pat. No. 5,236,962, all of which are incorporated by reference herein for all purposes as if fully set forth. It is also preferred that at least 40% of the pores have a diameter larger than 1 μm.

As indicated above, particular types of non-homopolymerizable grafting monomers may be used herein. By "non-homopolymerizable" is meant that the grafting monomers do not appreciably homopolymerize under the grafting conditions, that is, in the presence of free radicals, although some lower oligomerization (dimerization and trimerization) of these grafting monomers may occur under such conditions.

One such suitable grafting monomer is a vinyl silane, that is, a silicon compound which has one or more vinyl groups (—CH=CH$_2$) bonded to the silicon atom, preferably one vinyl group. A preferred type of vinyl silane has the formula $R^3{}_3SiCH=CH_2$ wherein each $R^3$ is hydrogen, a functional group, hydrocarbyl or substituted hydrocarbyl.

By "hydrocarbyl" herein is meant a univalent group containing only carbon and hydrogen. By "substituted hydrocarbyl" herein is meant a hydrocarbyl group that contains one or more substituent groups that are essentially inert under the process conditions to which the compound containing these groups is subjected (e.g., an inert functional group). By "(inert) functional group" herein is meant a group, other than hydrocarbyl or substituted hydrocarbyl, that is essentially inert under the process conditions to which the compound containing the group is subjected. Examples of functional groups include halo (fluoro, chloro, bromo and iodo), and ether such as —OR$^{50}$ wherein R$^{50}$ is hydrocarbyl or substituted hydrocarbyl.

Preferred groups for $R^3$ include (and any combination of these) alkyl, especially methyl, alkoxy containing 1 to 6 carbon atoms, halo especially chloro, and hydrogen.

Specific useful vinyl silanes include vinyltrimethylsilane, vinyldiphenylchlorosilane, vinyltrimethoxysilane, vinyltriethoxysilane, vinyltrichlorosilane, vinylsilane, (vinyl)(methyl)diethoxysilane, vinyltriacetoxysilane, vinyltris(2-methoxyethoxy)silane, vinyl triphenylsilane, and (vinyl)(dimethyl)chlorosilane.

Another suitable grafting monomer is a fluoroolefin of the formula $H_2C\!\!=\!\!CH(CH_2)_nR_f$, wherein $R_f$ and n are as defined above. In a preferred fluoroolefin n is 0. In another preferred fluoroolefin, $R_f$ is perfluoro-n-alkyl containing 1 to 20 carbon atoms, or $R_f$ is substituted perfluoroalkyl, especially: perfluoroalkyl containing one or more ether oxygen atoms between alkyl(ene) segments; or perfluoroalkyl containing one or more ether oxygen atoms between alkyl(ene) segments and having at least one other functional group as a substituent; or —$(CF_2)_mX$ wherein m is an integer of 1 to 20 and X is an atom or group other than fluorine, especially hydrogen, chlorine, sulfonyl fluoride (—$SO_2F$), carboxyl (—COOH), hydroxymethyl (—$CH_2OH$), amide (—$CONH_2$) or nitrile (—CN).

A third type of grafting monomer useful herein is an olefinic carboxylic acid or a derviative thereof of the formula $R^1CO_2R^2$ wherein $R^1$ and $R^2$ are as defined above. By "containing an olefinic double bond" (see the definition of $R^1$) is meant containing a carbon—carbon double bond that is not part of an aromatic ring. Since $R^1$ must contain at least 4 carbon atoms, it is evident that the carboxylic acid containing $R^1$ has 5 or more carbon atoms. $R^1$ may be substituted with any functional group which does not interfere with the grafting reaction, such as chloro, ether, carboxyl (meaning the carboxylic acid is a dicarboxylic acid) and ester. In one preferred form $R^1$ is $H_2C\!\!=\!\!CHR^4$— wherein $R^4$ a saturated hydrocarbylene or substituted saturated hydrocarbylene containing 2 or more carbon atoms. By "saturated hydrocarbylene" is meant a group containing only carbon and hydrogen and having two free valencies, and containing no carbon—carbon multiple bonds (including aromatic double bonds). More preferably $R^4$ is —$(CH_2)_q$— wherein q is an integer of 2 to 20. In these compounds it is preferred that $R^2$ is hydrogen or alkyl containing 1 to 6 carbon atoms.

The free radical generator may be a chemical compound, such as a peroxide or azonitrile, whose decomposition temperature (to generate radicals) characteristics are appropriate for the temperature at which it is desired to carry out the grafting reaction. The free radicals may be generated in any way that they usually can be made, for example in place of a chemical compound ionizing radiation may be used to generate the free radicals. If the free radical generator is a chemical compound, typically about 1 to about 20 percent by weight, more typically about 5 to about 10 percent by weight, of the polyolefin will be used. The generation of the free radicals may take place in the presence of the grafting compound or the free radicals may be generated first and then the grafting compound added. It is preferred that the grafting compound be present when the free radicals are generated. This is particularly convenient if a chemical compound is used as the free radical generator since the free radical generator may be mixed with the grafting compound and both imbibed (see below) into the polyolefin together. For example, one may act as the solvent for the other.

The temperature at which the grafting reaction takes place should be below the point at which the polyolefin may coalesce so as to close the pores in the polyolefin particles. This will depend on the glass transition temperature and/or melting point of the polyolefin. For most polyolefins this means a maximum temperature of about 150° C. or less is preferred, more preferably about 80° C. to about 130° C. It is also preferred that the grafting mixture not be exposed to oxygen after free radical generation has started. This may be most easily accomplished by carrying out the grafting process under an inert gas such as nitrogen.

In order to achieve the most uniform grafting of the polyolefin by the grafting compound it is preferred that the grafting molecules and free radical generating compound (if used) be mixed with the polyolefin before generation of the free radicals begins. It is believed that at least some of the grafting compound and free radical generator are imbibed by the pores in the polyolefin, thereby resulting in more even grafting of the polyolefin. It is believed that when the grafting monomer and/or (preferably and) free radical generator swell the polymer more even grafting may result. In some instances, particularly when using fluorinated olefins as the grafting compounds, they may not appreciably swell the polyolefin, and then it may be advantageous to also use small amounts, about one to five times the volume of the grafting compound, of a solvent which can at least partially dissolve the grafting compound and free radical generator, and swell the polymer. Useful solvents include aliphatic and aromatic halocarbons such as chlorobenzene and o-dichlorobenzene, depending on the process ingredients. This solvent, and any excess grafting compound and (if present) decomposition products from the free radical generator may be removed if desired after the grafting reaction by heating the grafted polyolefin under vacuum. This may be accomplished in an extruder with one or more vacuum ports.

The amount of grafting monomer actually grafted onto the polymer typically ranges from about 0.1 percent to about 100 percent, preferably about 1 percent to about 70 percent, of the original weight of the polyolefin. This may vary widely on a molar basis, depending on the molecular weight of the grafting monomer. For example, a grafting monomer containing many fluorine atoms may have a very high percentage by weight grafted, but this may be more modest when calculated on a molar basis. Some other details of this grafting process may be found in previously incorporated EP-A-0519341.

Preferably the grafted polymers obtained herein are not crosslinked, or are crosslinked to only a minor degree, so that they may be reformed thermoplastically, and a major portion of them is soluble in appropriate solvents. Alternatively the polyolefin may be suspended in a solvent which swells, but does not dissolve, the polyolefin and (at least partially) dissolves the free radical generator and grafting compound.

In the Examples the following abbreviations are used:

LLDPE—linear low density polyethylene

Mn—number average molecular weight

Mw—weight average molecular weight

PP—polypropylene

PSEPVE—perfluoro(3,6-dioxa-4-methyl-7-octenesulfonyl fluoride)

RT—room temperature

VTEOS—vinyltriethoxysilane

VTMOS—vinyltrimethoxysilane

As indicated above, polyolefins used and useful herein can be made by methods described or referenced in previously incorporated EP-A-0519341, U.S. Pat. No. 5,231,119 and U.S. Pat. No. 5,236,962. The porosity of the samples is measured by mercury porosimetry as described in U.S. Pat. No. 5,788,887 (which is incorporated by reference for all purposes as if fully set forth), and also see H. M. Rootare, *A Review of Mercury Porosimetry from Advanced Experimental Techniques in Powder Metallurgy*, p. 225–252, Plenum Press, 1970. Mercury porosimetry of the polyolefins used in the Examples showed most of the pores between 1 and 100 μm in diameter, with some as large as about 300 μm. Total pore volume fractions were over 0.07.

Methods for measuring the amount of grafting compound actually grafted are weight difference before and after extraction with a suitable solvent, either by extraction in an extractor such as a Soxhlet extractor, or by dissolving the grafted polyolefin and reprecipitating it in a nonsolvent, NMR measurements, or by elemental analysis (for example when fluorine containing grafting compounds are used).

Examples 1–2

A 50 mL Schlenk tube was charged with the following: 5 g of porous polymer granules [Spherilene® linear low density polyethylene (believed to be grade 16502) or Spheripol® polypropylene (believed to be grade KP 010) from Montell USA Inc. of Wilmington, Del.], 0.5 g of t-butyl peroxide (Aldrich), and 10 mL of (perfluoroalkyl)ethylene [Zonyl® BN from E. I. DuPont de Nemours and Co. of Wilmington, Del., which has the formula $H_2C=CH—(CF_2)_nF$, wherein n is mostly 6, 8 and 10]. The tube was evacuated and purged with nitrogen four times and then heated to 120° C. for 8 h under nitrogen atmosphere. After cooling to RT the polymer granules were filtered off and dissolved in a minimum amount of chlorobenzene. The chlorobenzene solution was poured into methanol and the precipitated polymer was filtered off, washed with methanol, and dried in a vacuum oven at 65° C. overnight. The results are shown in Table 1.

TABLE 1

| Example | Polymer | Fluoroolefin incorporation (weight %)[a] | Mw[b] | Mw/Mn[b] | Polymer Tm, (° C.)[c] |
|---|---|---|---|---|---|
| Control | PP | — | 226200 | 8.8 | 168 |
| 1 | PP | 17 | 96700 | 2.7 | 161 |
| Control | LLDPE | — | 106200 | 7.8 | 130 |
| 2 | LLDPE | 26 | 56400 | 2.8 | 126 | a) from % F. analysis.
b) by GPC in trichlorobenzene at 135° C.
c) by DSC at 20° C./min.

Example 3

A 50 mL Schlenk tube was charged with the following: 5 g of porous polymer granules (Spherilene® linear low density polyethylene or Spheripol® polypropylene from Montell USA Inc. of Wilmington, Del.), 0.5 g of t-butyl peroxide (Aldrich), and 10 mL of PSEPVE made according to U.S. Pat. No. 3,282,875. The tube was evacuated and purged with nitrogen four times and then heated to 120° C. for 8 h under nitrogen atmosphere. After cooling to RT the polymer granules were filtered off and placed in a Soxhlet extractor where they were extracted with acetone for 6 h to remove any traces of monomer or solvent. Finally the sample was dried in a vacuum oven at 70° C. overnight. Analysis (by weight difference and $^1H$ and $^{19}F$ NMR) of the polymers revealed that about 8 weight % PSEPVE grafted onto polyethylene but only trace amounts grafted onto polypropylene. This is probably due to the more polar nature of this monomer that makes it totally insoluble in PP.

Examples 4–7

Four 50 mL Schlenk tubes were each charged with the following: 5 g of polyethylene granules (Spherilene® linear low density polyethylene from Montell USA Inc. of Wilmington, Del.), 0.5 g of t-butyl peroxide (Aldrich), and 5 mL of PSEPVE. In addition three of the tubes were charged with 3, 5, and 10 mL quantities of chlorobenzene. The tubes were evacuated and purged with nitrogen four times and then heated to 120° C. for 8 h under nitrogen atmosphere. After cooling to RT the polymer granules were filtered off and placed in Soxhlet extractors where they were extracted with acetone for 8 h to remove any traces of monomer or solvent. Finally the samples were dried in a vacuum oven at 60° C. for 48 h. Under these reaction conditions the polymer granules did not dissolve in the reaction mixture but were swollen to different extents. The amount of grafted monomer increased dramatically by using a small amount of solvent. The results are shown in Table 2.

TABLE 2

| Example | PSEPVE/ Chlorobenzene (mL/mL) | PSEPVE incorporation (weight %) | mol% Repeat Units Grafted | Polymer Tm, (° C.) |
|---|---|---|---|---|
| 4 | 5/0 | 23.3 | 1.9 | 126 |
| 5 | 5/3 | 51.1 | 6.5 | 117 |
| 6 | 5/5 | 51.6 | 6.7 | 116 |
| 7 | 5/10 | 54.9 | 7.6 | 113 |

Examples 8–11

A 50 mL Schlenk tube was charged with the following: 5 g of porous polymer granules (Spherilene® linear low density polyethylene or Spheripol® polypropylene from Montell USA Inc. of Wilmington, Del.), t-butyl peroxide (Aldrich), and 10 mL of VTMOS or VTEOS (both from Aldrich). The tube was evacuated and purged with nitrogen four times and then heated to 120° C. for 8 h under nitrogen atmosphere. After cooling to RT the polymer granules were filtered off and placed in a Soxhlet extractor where they were extracted with methylene chloride for 8 h to remove any traces of monomer or solvent. Finally the sample was dried in a vacuum oven at 60° C. overnight. Results are shown in Table 3.

TABLE 3

| Example | Polymer | Vinylsilane | t-butyl peroxide, (g) | Vinylsilane Incorporation (mol %) | Vinylsilane Incorporation (weight %) |
|---|---|---|---|---|---|
| 8 | PP | VTMOS | 1 | 0.6 | 2 |
| 9 | LLDPE | VTMOS | 1 | 5.1 | 22 |
| 10 | PP | VTEOS | 0.5 | 3.5 | 14 |
| 11 | LLDPE | VTEOS | 0.5 | 11.6 | 47 |

Examples 12–17 and Comparative Examples A–K

A 50 mL Schlenk tube was charged with the following: 5 g of porous polymer granules (Spherilene® linear low density polyethylene or Spheripol® polypropylene from Montell USA Inc. of Wilmington, Del.), t-butyl peroxide (Aldrich), and 10 mL of grafting compound. The tube was evacuated and purged with nitrogen four times and then heated to 120° C. for 8 h under nitrogen atmosphere. After cooling to RT the polymer granules were dissolved in a minimum amount of chlorobenzene and the solution was poured into methanol. The precipitated polymer was filtered off, washed with methanol, and dried in a vacuum oven at 60° C. overnight. Results are shown in Table 4.

TABLE 4

| Example | Polymer | Grafting Compound | t-butyl peroxide (g) | Monomer Incorporation (weight %) | Monomer Incorporation (mol %) |
|---|---|---|---|---|---|
| A | PP | Vinyl Acetic Acid | 0.5 | 0 | 0 |
| B | LLDPE | Vinyl Acetic Acid | 0.5 | 0 | 0 |
| C | PP | Crotonic Acid | 0.5 | 0 | 0 |
| D | LLDPE | Crotonic Acid | 0.5 | 0 | 0 |
| 12 | PP | 4-Pentenoic Acid | 0.5 | 7.5 | 3.4 |
| 13 | LLDPE | 4-Pentenoic Acid | 0.5 | 4.5 | 1.3 |
| 14 | PP | 10-Undecylenic Acid | 0.5 | 4.5 | 1.1 |
| 15 | LLDPE | 10-Undecylenic Acid | 0.5 | 5.6 | 0.9 |
| 16 | PP | Methyl 10-Undecenoate | 0.5 | 14 | 3.4 |
| 17 | LLDPE | Methyl 10-Undecenoate | 0.5 | 5.4 | 0.8 |
| G | PP | Itaconic Anhydride | 0.5 | 0 | 0 |
| E | LLDPE | Itaconic Anhydride | 0.5 | 0 | 0 |
| F | PP | Maleic Anhydride | 0.3 | 0 | 0 |
| G | LLDPE | Maleic Anhydride | 0.3 | 0 | 0 |
| H | PP | Dimethyl Maleate | 0.5 | 3.9 | 1.2 |
| I | LLDPE | Dimethyl Maleate | 0.5 | 4.0 | 0.8 |
| J | PP | Methyl Maleate | 0.5 | 1.1 | 0.4 |
| K | LLDPE | Methyl Maleate | 0.5 | 0.9 | 0.2 |

What is claimed is:

1. A process for the grafting ofapolyolefm polymer, comprising the step of contacting a porous polyolefin polymer having a pore volume fraction of at least 0.07, a free radical generator, and a non-homopolymerizable grafting monomer selected from the group consisting of a vinyl silane, a compound of the formula $H_2C=CH(CH_2)_nR_f$, and compound of the formula $R^1CO_2R^2$, wherein:

$R_f$ is a fluoroalkyl group having more fluorine atoms than carbon atoms;

n is 0 or 1;

$R^1$ is hydrocarbyl having 4 or more carbon atoms, and containing an olefinic double bond, provided that said olefmic double bond is not part of a ring; and $R^2$ is hydrogen, hydrocarbyl or substituted hydrocarbyl; wherein said grafting monomer is contacted with said porous polyolefin either simultaneously wit said free radical generator, or after contacting said porous polyolefin with said free radical generator, and provided that if said free radical generator is a chemical free radical generator said contacting of said porous polyolefin and said chemical free radical generator is done at a temperature at which said chemical free radical generator generates free radicals, whereby said grafting monomer is grafted to said porous polyolefin.

2. The process of claim 1, wherein said grafting monomer is a vinyl silane of the formula $R^3_3SiCH=CH_2$ wherein each $R^3$ is hydrogen, a functional group, hydrocarbyl or substituted hydrocarbyl.

3. The process of claim 2, wherein each $R^3$ is independently alkyl, alkoxy containing 1 to 6 carbon atoms, chloro, or hydrogen.

4. The process of claim 1, wherein said grafting monomer has the formula $H_2C=CH(CH_2)_nR_f$, wherein $R_f$ is perfluoro-n-alkyl containing 1 to 20 carbon atoms, perfluoroalkyl containing one or more ether oxygen atoms between alkyl(ene) segments, perfluoroalkyl containing one or more ether oxygen atoms between alkyl(ene) segments and having at least one other functional group as a substituent, or $-(CF_2)_mX$ wherein m is an integer of 1 to 20 and X is chlorine, sulfonyl fluoride, carboxyl, hydroxymethyl, amide or nitrile.

5. The process of claim 1, wherein said grafting monomer has the formula $R^1CO_2R^2$, wherein $R^1$ is $H_2C=CHR^4-$ wherein $R^4$ a saturated hydrocarbylene or substituted saturated hydrocarbylene containing 2 or more carbon atoms, and $R^2$ is hydrogen or alkyl containing 1 to 6 carbon atoms.

6. The process of claim 1, wherein said polyolefin is a homopolymer of ethylene or propylene, or a copolymer containing 2 or more of ethylene, propylene, and 1-butene.

7. The process of claim 1, wherein a free radical generator is a chemical compound.

8. The process of claim 1, wherein said polyolefin is a copolymer containing one or more of ethylene, propylene, and 1-butene, and one or more of acrylic acid, and acrylic acid ester, methacrylic acid, or a methacrylic acid ester.

9. A improved process for the free radical grafting of vinyl compounds onto a porous polyolefin having a pore volume fraction of at least 0.07, by contacting said porous polyolefin with a grafting agent in the presence of free radicals, wherein the improvement comprises using as a grafting agent a non-homopolynierizable monomer selected from the group consisting a vinyl slime, a compound of the formula $H_2C=CH(CH_2)_nR_f$ and a compound of the formula $R^1CO_2R^2$, wherein:

$R_f$ is a fluoroalkyl group having more fluorine atoms than carbon atoms;

n is 0 or 1;

$R^1$ is hydrocarbyl having 4 or more carbon atoms, and containing an olefinic double bond, provided that said olefinic double bond is not part of a ring; and $R^2$ is hydrogen, hydrocarbyl or substituted hydrocarbyl.

10. The improved process of claim 9, wherein said grafting monomer is a vinyl silane of the formula $R^3_3SiCH=CH_2$ wherein each $R^3$ is hydrogen, a functional group, hydrocarbyl or substituted hydrocarbyl.

11. The improved process of claim 10, wherein each $R^3$ is independently alkyl, alkoxy containing 1 to 6 carbon atoms, chloro, or hydrogen.

12. The improved process of claim 9, wherein said grafting monomer has the formula $H_2C=CH(CH_2)_nR_f$, wherein $R_f$ is perfluoro-n-alkyl containing 1 to 20 carbon atoms, perfluoroalkyl containing one or more ether oxygen atoms between alkyl(ene) segments, perfluoroalkyl containing one or more ether oxygen atoms between alkyl(ene) segments and having at least one other functional group as a substituent, or —$(CF_2)_m$X wherein m is an integer of 1 to 20 and X is chlorine, sulfonyl fluoride, carboxyl, hydroxymethyl, amide or nitrile.

13. The improved process of claim 9, wherein said grafting monomer has the formula $R^1CO_2R^2$, wherein $R^1$ is $H_2C=CHR^4$— wherein $R^4$ a saturated hydrocarbylene or substituted saturated hydrocarbylene containing 2 or more carbon atoms, and $R^2$ is hydrogen or alkyl containing 1 to 6 carbon atoms.

14. The improved process of claim 9, wherein said polyolefin is a homopolymer of ethylene or propylene, or a copolymer containing 2 or more of ethylene, propylene, and 1-butene.

15. The improved process of claim 9, wherein a free radical generator is a chemical compound.

16. The improved process of claim 9, wherein said polyolefin is a copolymer containing one or more of ethylene, propylene, and 1-butene, and one or more of acrylic acid, and acrylic acid ester, methacrylic acid, or a methacrylic acid ester.

* * * * *